United States Patent [19]

Koo et al.

[11] 3,992,201

[45] Nov. 16, 1976

[54] FILAMENTS FOR FLUORESCENT LAMPS

[75] Inventors: Ronald C. Koo, Weehawken; Joel Shurgan, Washington Township, Bergen County both of N.J.

[73] Assignee: Duro-Test Corporation, North Bergen, N.J.

[22] Filed: Mar. 4, 1974

[21] Appl. No.: 447,482

Related U.S. Application Data

[60] Division of Ser. No. 223,607, Feb. 4, 1972, Pat. No. 3,812,393, which is a continuation-in-part of Ser. No. 66,275, Aug. 24, 1970, Pat. No. 3,662,789.

[52] U.S. Cl. .................................. 75/207; 252/515

[51] Int. Cl.[2] ....................... G01F 1/22; H01B 1/02

[58] Field of Search ....................... 75/207; 313/344; 252/515, 518

[56] References Cited

UNITED STATES PATENTS

| | | | |
|---|---|---|---|
| 3,341,917 | 9/1967 | Oyabu et al. | 313/344 |
| 3,346,761 | 10/1967 | Ackerman | 313/344 |
| 3,812,393 | 5/1974 | Koo et al. | 313/344 |

*Primary Examiner*—Benjamin R. Padgett
*Assistant Examiner*—Josephine Lloyd
*Attorney, Agent, or Firm*—Darby & Darby P.C.

[57] ABSTRACT

An annealed tungsten filament wire for electric lamps having substantially the same amounts of impurities therein as was present prior to annealing.

9 Claims, 3 Drawing Figures

FILAMENTS FOR FLUORESCENT LAMPS

This application is a division of our prior copending application Ser. No. 223,607, filed Feb. 4, 1972, entitled "Reduced Impurity Filament For Electric Lamps", now U.S. Pat. No. 3,812,383, granted May 24, 1974 which is in turn a continuation-in-part of our prior application Ser. No. 66,275, filed Aug. 24, 1970, now U.S. Pat. No. 3,662,789, dated May 16, 1972, entitled "Mandrel For Manufacturing Filament Coils and Method for Manufacturing Filament Coils" both of which are assigned to the same assignee.

BACKGROUND OF THE INVENTION

Filaments of tungsten wire are in widespread use for incandescent and fluorescent lamps. In recognition of the detrimental effects of impurities on the metallurgical properties of tungsten, lamp manufacturers take extraordinary steps to produce tungsten wire having a minimum amount of residual impurities. For example, tungsten ore of the highest purity is used, and, to prevent impurity contamination during processing, the reduction of tungsten oxide is generally carried out in tungsten boats. Furthermore, as a routine quality control procedure, impurity analyses are carried out on the material at various stages of the powder-metallurgy process.

While a high degree of care is exercised in the manufacture of the filament wire, the manufacture of the filaments themselves has remained basically unchanged for the past 40 years. The conventional manufacturing procedure, in general, does not take into account any impurities which are introduced into the filament nor the deleterious effects of these impurities.

Tungsten filaments for electric lamps are commonly manufactured in the form of coils or coiled coils, the latter comprising a coil which is itself coiled. The most commonly used method for making such filament coils comprises the following steps: (1) winding tungsten wire as a coil on an elongated mandrel; (2) annealing the coil while still on the mandrel by passing it through a hydrogen furnace maintained at an elevated temperature, usually about 1200° C.; (3) cutting the mandrel and coil to the desired length of the individual filaments; (4) dissolving away the individual mandrels in a suitable acid such as hydrochloric acid; and (5) reannealing the tungsten wire in wet hydrogen at an elevated temperature, usually around 1300° C, for cleaning.

The two materials for mandrels in common use throughout the lamp industry are steel and molybdenum. Aside from economics, the choice of mandrel material is severely limited by a large number of technical requirements. The most significant of these requirements for the mandrel are: (1) high tensile strength is required for filament winding and annealing under tension without plastic deformation of the mandrel; (2) the melting point of the mandrel must be above the annealing temperature required to set the filament coil prior to cutting; (3) the temperature coefficient of expansion of the mandrel should be close to that of the filament coil at the annealing temperature; (4) an adequate amount of bonding is needed between the filament coil and the mandrel during annealing to assure the retention of coil geometry upon subsequent cutting of the mandrel into individual filaments; and (5) the mandrel must be capable of being dissolved chemically without affecting the tungsten coil. For the foregoing reasons steel mandrels have been and are currently being used almost universally for most coiled filaments while molybdenum mandrels are used for coiled-coil filaments which require annealing temperatures above the melting point of steel.

The use of steel for the mandrel material, although economical, is undesirable from the standpoint of quality of the filaments produced, since steel has an adverse effect on the metallurgical properties of the tungsten filament during the manufacturing process. The main reason is that in forming the bond between the coil and the mandrel during the annealing step, a small amount of iron inevitably diffuses into and embrittles the tungsten. To understand this it should be considered that in the heavily drawn tungsten wire used as lamp filaments, a fibrous substructure exists prior to recrystallization, the average subgrain size of this structure being less than one micron. It is well recognized that substitutional diffusion of elements, such as iron, in tungsten occurs much more rapidly along sub-boundaries and grain boundaries of the tungsten than within the grains through the normal lattice sites. Since the activation energy for volume diffusion (within the grains) — being around 120 Kcal/mole for iron in tungsten — is several times higher than that for interfacial diffusion (along boundaries), an appreciable amount of interfacial diffusion can occur readily at temperatures less than one-half that of the tungsten. Therefore for tungsten, which has a high concentration of sub-boundaries and grain boundaries per unit volume when formed as heavily drawn wire used in filaments, a substantial amount of iron diffuses into the tungsten preferentially along the boundaries during annealing at a relatively low temperature. Furthermore, a concentration gradient of iron in the tungsten coil also exists, which decreases from the inner coil surface, in contact with the mandrel, to the outer coil surface, which is never in contact with the mandrel.

For tungsten filaments made by conventional methods on a steel mandrel, it has been substantiated, by impurity analyses on annealed coils made after dissolving away the steel mandrel, that an appreciable amount of iron diffuses into the filament coil. The amount of iron present after annealing varies from one coil segment to another, and depends upon the prior history of the tungsten wire. For tungsten wire approximately 2.5 mils in diameter, annealing in the manner described above typically results in an increase in iron concentration up to 50–100 ppm (by weight), as compared with 10 ppm or less of iron in the wire prior to annealing. Analyses of the surface material etched off from the annealed coil shows concentrations of iron substantially above 100 ppm.

The presence of localized segregations of iron diffused into a tungsten wire filament coil has been found to be responsible for the formation of numerous slivers of iron on annealed filament coils after the mandrel has been dissolved away. When the coil is stretched out, the slivers are evident on the inner surface of the coil at the areas where it was originally in contact with the steel mandrel. The amount of slivering increases with increasing concentration of iron, and is absent wherever the diffusion of iron into the tungsten wire coil is prevented.

Tungsten wire filament coils having excessive segregations of iron are also brittle and contribute to shrinkage (rejects) in the manufacture of electric lamps. Fracture of the filaments frequently occurs at the inner side of the coil being clamped by the leads during mounting of the coil in a lamp. This is indicative of the strong embrittlement effect of localized iron, since the compressive stresses at the inner side of the coil should favor plastic flow instead of crack initiation.

Another detrimental effect of iron is to reduce the advantages achieved by doping in non-sag filaments. Incandescent lamp filaments are normally doped with small quantities of aluminum, silicon, and potassium compounds to raise the recrystallization temperature and to develop an interlocking grain structure characteristic of sag resistant tungsten at elevated temperatures. It is well known that iron diffused into doped tungsten reduces the recrystallization temperature and develops a non-interlocking equi-axed grain structure, partially nullifying the effect of dopants in producing a nonsag material.

In accordance with the present invention a new type mandrel is utilized for forming filament coils as well as a new method for manufacturing filament coils. These provide a filament in which the amount of impurities introduced therein during manufacture can be controlled and reduced. Filaments made in accordance with the subject invention have been found to have greatly improved operating characteristics, due to the reduction in the impurity content.

In accordance with a preferred embodiment of the invention, a material which has a lower melting point than the filament material and does not alloy therewith is coated over an inner core of the mandrel. The coil is then wound over the coated mandrel and is annealed. The annealed coil is cut into desired lengths and the mandrel is dissolved from the core. Upon annealing of the filament, the coating material forms a strong bond with the coil and serves as a barrier to the diffusion of the inner core material into the filament coil. This produces a filament having substantially no additional impurities diffused therein from what was present in the filament material prior to annealing. The coating material on the mandrel also eliminates the formation of slivers on and the embrittlement of the annealed coil. Further, the coating material also aids in speeding the dissolving process.

In a preferred embodiment of the invention, copper or a copper alloy is used as the coating material over an inner mandrel core of steel. The copper or copper alloy melts during the annealing of the filament coil and forms a bond therewith to provide a better geometrical set. The mandrels also can be dissolved very rapidly from the coils using a suitable acid, such as nitric acid.

An another aspect of the invention, the coating material can be applied to the wire rather than to the mandrel.

It is therefore an object of the present invention to provide an improved filament for use with electric lamps.

A further object is to provide an improved tungsten filament for an electric lamp which, after annealing, has substantially the same amount of impurities present as before annealing.

Other objects and advantages of the present invention will become more apparent upon reference to the following specification and annexed drawings, in which.

Figure 1:
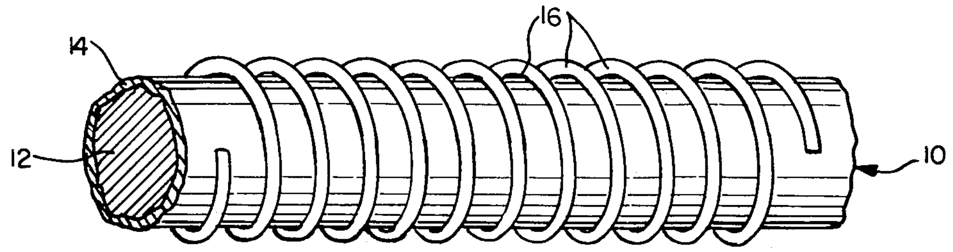
FIG. 1 is a perspective view of the mandrel of the subject invention showing the filament coil wound thereon.

Referring to FIG. 1, a mandrel 10 has an inner core 12 on which is coated a thin layer of a suitable material 14. In the preferred embodiment of the invention being described, the core 12 is steel and the material of the coating 14 is copper. Alloys of copper also can be used as is described below. Where steel is used as the inner core and copper or a copper alloy as the coating material, the latter can be plated or clad on to the inner core.

A coil 16 of filament wire is wound on the outer layer 14 out of direct contact with the mandrel inner core 12. The wire is, for example, of tungsten material and any suitable number of turns per inch of the coil can be wound. Copper is used as the preferred coating material when working with a tungsten. The choice of copper in conjunction with tungsten wire is advantageous in that copper readily wets tungsten but has no detectable solubility in tungsten.

Considering now the preferred embodiment of the manufacturing process for the mandrel shown in FIG. 1, the copper or a copper alloy is coated onto a steel wire core which is initially at a relatively large diameter wire size. For example, the wire is in the order of 0.1 inch in diameter and the thickness of the coating is 0.003 inch. The coated steel wire is then drawn to a fine wire size, for example, in the order of 0.01 inch in diameter with the coating layer having a thickness of about 0.0003 inch. By doing this the copper or copper alloy becomes sufficiently work-hardened to the extent that it resists deformation during winding of the coil on the mandrel. The thickness of the coating needed depends in large measure upon the mandrel diameter.

To produce the improved filament, in accordance with the preferred embodiment of the invention a coil of tungsten wire is wound on the mandrel with the desired number of turns per inch. The tungsten coil on the mandrel is then annealed at a temperature around 1100° C by passing it through a tube type furnace containing a non-oxidizing atmosphere of hydrogen or nitrogen. The mandrel and coil are then cooled to room temperature.

After the annealing and cooling, the coil and the mandrel are cut to desired lengths. The individual cut mandrels are then dissolved from the coils. To do the latter, the individual coils and mandrels are placed in a container which is partially filled with water at room temperature. Concentrated nitric acid is then added to the water to attain an acid concentration of 25% to 35% or, preferably, the acid is mixed to the desired concentration before the coils are placed in the container. The entire mandrel is dissolved rapidly in this solution leaving the coil. The tungsten coils are ready to be used as filaments after they are removed from the acid bath and washed.

Figure 2:
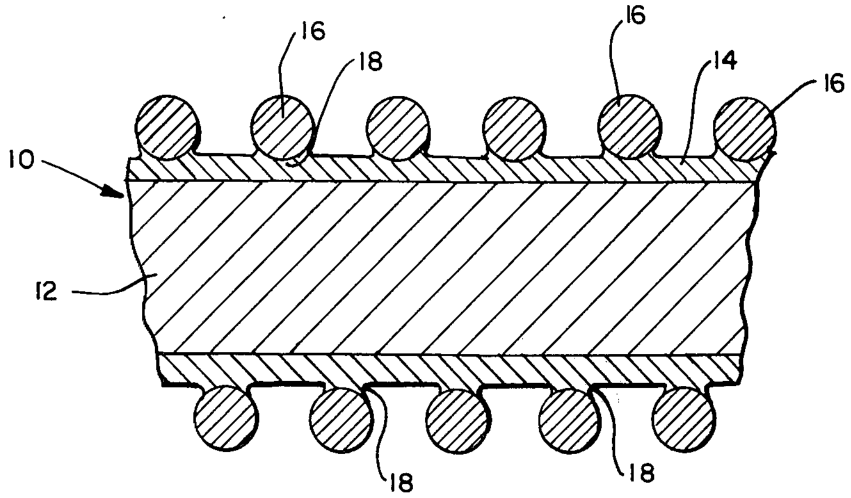
FIG. 2 is a cross-section of an annealed coil shown on a mandrel.

The present invention has numerous advantages with respect to the copper-coated mandrel itself. Copper has a melting point within the temperature range required to "set" the tungsten coil by annealing. Visual inspection of the annealed coils made in accordance with the invention showed that the copper was molten during the annealing process (the melting point of copper is 1083° C.) and that a strong bond was formed between the coil and the mandrel copper layer upon cooling. This is shown in FIG. 2 where bonding points 18 of the coil to the previously molten coating material 14 are shown. The bond has been found to be stronger that that normally obtained from a coil wound on a steel mandrel without copper coating. The reason for this is that the flow of molten copper partially around the tungsten wire provides a larger area of bonding between the tungsten wire and the copper coated mandrel. The strong bond formed between the filament coil and the copper upon melting and resolidifying of the copper aids in retaining the coil geometry upon cutting the annealed continuous coil into the desired lengths of individual filaments.

As a further advantage, the surface tension of copper is sufficiently high so that the molten copper does not drip off during annealing of the filament and remains as a layer over the steel core, the latter never being in contact with the tungsten coil. This is also illustrated in FIG. 2. The bond is formed by resolidification of the molten copper coating 14 partially around the tungsten coil 16 at points 18 with a layer of copper 14 remaining over the inner steel core 12. It has been found that a copper coating of 0.0002 inch thick is sufficient to prevent the diffusion of any significant quantities of iron from the steel core to other impurities into the tungsten filament coil for annealing times on the order of ten seconds at 1100° C.

Another advantage of using copper-covered steel mandrel is the increase in efficiency of coil processing through the use of nitric acid in dissolving the mandrel. In the conventional prior art method, steel mandrels are dissolved in hydrochloric acid and require as long as over one hour for complete dissolution of mandrels of large diameter. In the present invention, the copper-covered mandrels are dissolved rapidly in nitric acid, preferably 25% nitric acid to which is added 10% sulfuric acid. For example, complete dissolution of steel mandrels 0.011 inch diameter in hydrochloric acid requires about 25 minutes, whereas copper-covered steel mandrels of the same size are completely dissolved in a nitric acid - sulfuric acid bath within one minute.

That the entire copper-covered mandrel can be dissolved rapidly in a relatively concentrated solution of nitric acid is attributed to the depassivating effect of the copper coating on the inner steel core. Without the copper coating, steel becomes passivated in nitric acid at concentrations above approximately 20% and resists attack by the acid. The copper-covered steel mandrels, however, are readily dissolved in nitric acid at concentrations up to 50%.

It has been found that the use of the copper-covered steel mandrel and the process for dissolving the mandrels further improves the quality of the completed coiled filaments. Since the copper-covered steel mandrels can be dissolved within a few minutes without applying heat, the weight loss on coils which occurs during mandrel dissolving is substantially less than on coils processed with hydrochloric acid, typically the weight loss being reduced by 50%. The decrease in weight loss increases the uniformity of processed coils and the lumen output of the filament used in a lamp.

An additional advantage of dissolving the copper-covered steel mandrel in nitric acid is that the aquadag coating on the tungsten coil is simultaneously removed. In the conventional method of dissolving the uncoated steel mandrel in hydrochloric acid, the aquadag remains on the tungsten coil and is removed by subsequent firing of the coils in wet hydrogen above 1400° C.

In the present invention, firing the coils for cleaning is often times no longer necessary. Coils from which the mandrels are dissolved away in nitric acid at temperatures above 80° C. are generally free of Aquadag and can be used in lamps without further cleaning. This contributes to a reduction in manufacturing cost.

The present invention is not restricted to pure copper as the coating material and a specific type of steel as the inner core. Alloys of copper also can be used for the coating material. For example, copper-base alloys coated on the steel mandrel can achieve the same results as are described above. The addition of 1% – 5% of silver or indium into copper decreases the melting point of pure copper. Since alloys of these compositions exhibit a liquid-solid region extending through a wide temperature range, the alloys remain partially molten in a temperature range lower than the melting point of pure copper. This has two advantages over pure copper. First, control of the annealing temperature of the tungsten coil is less critical. Second, the ability to form a bond between the coil and the mandrel at lower temperatures further improves the ductility of the tungsten since the inherent ductility of heavily drawn tungsten wire decreases with increasing annealing temperature. The presence of these alloying elements, such as indium or silver, has no detrimental effect on the tungsten coil because of the lack of solubility of these elements in tungsten.

Filament coils processed in the manner previously described on copper-covered or copper-alloyed mandrels have been inspected and have been found to be substantially completely free of slivers. This indicates the absence of diffusion of iron into the coil. The absence of slivering is also accompanied by a marked increase in ductility. The increase in ductility is most pronounced on coils which are fully recrystallized; that is, annealed or flashed at temperatures above 2000° C. Recrystallized coils processed on copper-covered steel mandrels can be stretched at room temperature for length several times greater than coils processed similarly on bare steel mandrels before fracture occurs. This not only improves the shrinkage, decreases waste in coil mounting during manufacturing, but also increase the cold-shock resistance of filaments when mounted in lamps.

Filaments made in accordance with subject invention have been found to have substantially the same amounts of impurities after annealing as was present in the filament material prior to annealing. This is believed due to the fact that the coating material on the mandrel acts as a barrier against diffusion of the mandrel core material into the filament. Tungsten filament wire made in accordance with prior art techniques on a steel mandrel has an increase in iron concentration up to 50–100 ppm (by weight) as compared with 10 ppm or less of iron in the wire prior to annealing. Tungsten filament wire made in accordance with subject invention has substantially the same amount of iron and other impurities present after annealing as was present before annealing. In general, the iron concentration is normally less than 15 ppm.

Figure 3:
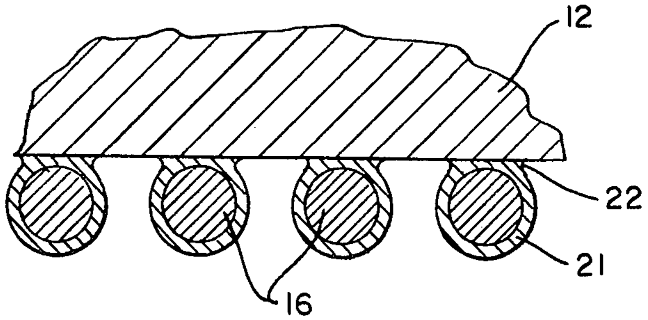
FIG. 3 is a cross-sectional view of an annealed coil according to another embodiment of the invention.

FIG. 3 shows another embodiment of the invention. Here, the mandrel core 12, which is illustratively of steel is left uncoated. The core 12 is formed to the desired diameter by any suitable technique. The wire 16, which is illustratively tungsten, is provided with the protective coating 21, which is illustratively of copper or an alloy thereof as previously described. To form the coated wire, the wire 16 itself is first formed to the desired diameter, for example by drawing. The coating 21 is then applied to the desired thickness. One suitable process for applying the coating is by electroplating. Other conventional processes also can be used.

The manufacture of filaments using the coated wire and the uncoated mandrel, of FIG. 3 is carried out in the same manner as previously described after the coated wire is wound over the mandrel. FIG. 3 shows the wire over the mandrel at a time after the annealing has been carried out. As seen, an amount of the coating material 21 has melted during annealing from the wire to form the fillet shaped areas 22. However, an amount of coating material 21 remains between the mandrel core 12 and the wire 16 to prevent the impurities from entering the wire. The mandrel and coating are dissolved and the processing of the filament is completed in the manner previously described.

In both of the embodiments of the invention described, it should be understood that the coating, of either the filament wire or the mandrel, aids in preventing impurities from the mandrel and other sources from entering the filament wire.

The present invention also finds application in the manufacture of coiled-coil filaments. Here, the molybdenum mandrel is coated or the wire is coated. The acids used to dissolve the mandrel are selected accordingly.

Tungsten filaments made in accordance with the subject invention also retain the high tensile strength and ductility characteristic of uncontaminated, unrecrystallized, heavily drawn tungsten wire. In contrast, tungsten filaments made on uncoated steel mandrels become brittle and weak, the extent of embrittlement and weakening being a function of the amount of iron diffused into the tungsten wire coil during annealing. As a typical example, C-9 tungsten filaments made in accordance with the invention for a 60 watt lamp, have a uniformly high breaking load in tension in the range of 406–418 grams. Tungsten filaments processed on an uncoated steel mandrel exhibit breaking loads over a wide range, as low as 31 grams.

What is claimed is:

1. A filament for an electric lamp made from tungsten wire having a predetermined amount of impurities before annealing comprising annealed tungsten wire existing after removal from a base material on which it was annealed at an elevated temperature, the annealed wire having substantially the same impurities therein as was present in the wire before annealing.

2. A filament as in claim 1 wherein the wire is in coil form and the material from which it was removed comprised a mandrel around which the coil was wound.

3. A filament as in claim 2 wherein the wire was heavily drawn prior to annealing and being wound on the mandrel.

4. A filament as in claim 1 wherein the base material on which the wire was annealed contained iron and the wire has less than 15 parts per million (by weight) of iron constituting one of the impurities after removal from the base material.

5. A filament as in claim 2 wherein the mandrel contained iron and the wire has less than 15 parts per million (by weight) of iron constituting one of the impurities after removal from the mandrel.

6. A tungsten wire filament for an electric lamp produced by annealing at an elevated temperature the wire having a predetermined amount of impurities therein before annealing as the wire is held on a form, the wire having substantially no additional impurities introduced into it from the material of the form.

7. A tungsten wire filament as in claim 6 wherein the mandrel comprised the form and the wire was wound around the mandrel prior to annealing.

8. A tungsten wire filament as in claim 7 wherein the mandrel material included iron.

9. A tungsten wire filament as in claim 1 wherein the wire contains less than 15 parts per million (by weight) after annealing.

* * * * *